(12) United States Patent
Kwon

(10) Patent No.: US 12,060,938 B2
(45) Date of Patent: Aug. 13, 2024

(54) ELECTRIC MOTOR WITH INTEGRAL GEARBOX

(71) Applicant: Jungwoo Kwon, Cheonan-si (KR)

(72) Inventor: Jungwoo Kwon, Cheonan-si (KR)

( * ) Notice: Subject to any disclaimer, the term of this patent is extended or adjusted under 35 U.S.C. 154(b) by 238 days.

(21) Appl. No.: 17/636,435

(22) PCT Filed: Nov. 25, 2020

(86) PCT No.: PCT/KR2020/016746
§ 371 (c)(1),
(2) Date: Feb. 18, 2022

(87) PCT Pub. No.: WO2022/034977
PCT Pub. Date: Feb. 17, 2022

(65) Prior Publication Data
US 2022/0282788 A1 Sep. 8, 2022

(30) Foreign Application Priority Data
Aug. 13, 2020 (KR) .......................... 10-2020-0101888

(51) Int. Cl.
*F16H 63/30* (2006.01)
*F16H 1/36* (2006.01)
(Continued)

(52) U.S. Cl.
CPC ............. *F16H 63/304* (2013.01); *F16H 1/36* (2013.01); *F16H 3/72* (2013.01); *H02K 1/16* (2013.01);
(Continued)

(58) Field of Classification Search
CPC . F16H 63/304; F16H 1/36; F16H 3/72; F16H 2063/305; H02K 1/16; H02K 1/27
(Continued)

(56) References Cited

U.S. PATENT DOCUMENTS 6,394,924 B1 * 5/2002 Schiebold ................ B60K 6/54
903/910
6,474,428 B1 * 11/2002 Fujikawa ............... B60K 6/365
903/952

(Continued)

FOREIGN PATENT DOCUMENTS

CN          201130890 Y       10/2008
DE       102013211301 A1      12/2014
(Continued)

OTHER PUBLICATIONS

Extended European Search Report for application No. 20944840.6, Oct. 17, 2022, 10 pages.

(Continued)

*Primary Examiner* — Ha Dinh Ho
(74) *Attorney, Agent, or Firm* — Jason Plotkin

(57) ABSTRACT

The present disclosure relates to an electric motor with an integral gearbox, and the electric motor may include a stator provided with a first member disposed on an inner circumferential surface of an enclosure to generate an electromagnetic force, a rotor provided with a second member disposed on an outer circumferential surface to face an inner circumferential surface of the stator to generate an electromagnetic force together with the first member, a gear assembly disposed with a gear tooth on an inner circumferential surface of the rotor, and provided inside the rotor, and a control unit that controls the gear assembly, wherein the gear assembly includes one or more gear plates that rotate as the rotor rotates, a connecting gear disposed to be selectively coupled to any one of the one or more gear plates, and an output shaft that rotates together as the connecting gear rotates to transmit a rotational force to the outside, and the control unit controls the moving part according to a shift (Continued)

signal to allow the connection gear to be coupled to or decoupled from any one of the one or more gear plates.

14 Claims, 15 Drawing Sheets

(51) Int. Cl.
*F16H 3/72* (2006.01)
*H02K 1/16* (2006.01)
*H02K 1/27* (2022.01)
*H02K 7/116* (2006.01)
*H02K 11/21* (2016.01)
*H02K 29/06* (2006.01)

(52) U.S. Cl.
CPC .............. *H02K 1/27* (2013.01); *H02K 7/116* (2013.01); *H02K 11/21* (2016.01); *H02K 29/06* (2013.01); *F16H 2063/305* (2013.01)

(58) Field of Classification Search
USPC ................................... 74/661, 335
See application file for complete search history.

(56) References Cited

U.S. PATENT DOCUMENTS

| | | | |
|---|---|---|---|
| 9,441,599 B2 * | 9/2016 | Bangura | F02N 11/04 |
| 9,482,330 B1 * | 11/2016 | Holmes | H02K 51/00 |
| 10,670,143 B2 * | 6/2020 | Liu | H02K 1/278 |
| 10,941,838 B2 | 3/2021 | Georgiev | F16H 57/082 |
| 11,161,403 B2 * | 11/2021 | Lo | B60L 50/15 |
| 11,313,440 B2 * | 4/2022 | Harvey | F02C 7/36 |

FOREIGN PATENT DOCUMENTS

| | | |
|---|---|---|
| EP | 2218604 A1 | 8/2010 |
| EP | 3615360 A1 | 11/2018 |
| JP | 2005287215 A | 10/2005 |
| KR | 100911151 B1 | 8/2009 |
| KR | 20110012177 A | 2/2011 |
| KR | 1020110012177 A | 2/2011 |
| KR | 101808089 B1 | 12/2017 |
| KR | 20190063700 A | 6/2019 |
| KR | 1020190063700 A | 6/2019 |

OTHER PUBLICATIONS

English abstract for DE 102013211301A1, 2 pages.
English Abstract for CN 2001130890Y, 1 page.
English Abstract for EP 3615360A1, 4 pages.
Notice of preliminary examination results of KR Patent Appl. No. 10-2020-0101888 dated Sep. 28, 2020, p. 3.
Notice of Allowance of KR Patent Appl. No. 10-2020-0101888 dated Nov. 11, 2020, p. 2.
Abstract, KR1020110012177A, p. 1.
Abstract, JP2005287215A, p. 1.
International Search report issued by KIPO for application PCT/KR2020/016746, issued May 6, 2021, p. 8.
English abstract for application KR100911151B1, published Aug. 6, 2009, p. 1.
English abstract for application KR101808089B1, published Dec. 13, 2017, p. 1.
8 English abstract for application KR1020190063700, published Jun. 10, 2019, p. 1.
JPO office action for application JP 2022-506719, filing date Dec. 27, 2022, 3 pages.
English abstract for KR20110012177A, Published Feb. 9, 2011, 1 page.
English Abstract for JP2005287215A, Published Oct. 13, 2005, 1 page.
English Abstract for KR20190063700A, Published Jun. 10, 2019, 1 page.
English Abstract for KR20080067557A, also published as KR100911151B1, published Jul. 21, 2008, 1 pages.

* cited by examiner (a)

(b)

(a)

(b)

(a)

(b)

ELECTRIC MOTOR WITH INTEGRAL GEARBOX

CROSS-REFERENCE TO RELATED APPLICATIONS

This application is the National Stage filing under 35 U.S.C. 371 of International Application No. PCT/KR2020/016746, filed on Nov. 25, 2020, which claims the benefit of earlier filing date of and rights of priority to Korean Application No. 10-2020-0101888 filed on Aug. 13, 2020, the contents of which are all hereby incorporated by reference herein in their entirety.

TECHNICAL FIELD

The present disclosure relates to an electric motor with an integral gearbox, and more particularly, to an electric motor with an integral gearbox capable of including one or more shiftable gear plates inside the electric motor.

BACKGROUND ART

In recent years, as interest in and awareness of environmental issues have increased, a paradigm of the automobile industry aims to improve fuel efficiency based on the reinforcement of various environmental regulations aimed at reducing greenhouse gas emissions.

Accordingly, starting with the advent of hybrid vehicles, the development and commercialization of electric power based vehicles such as plug-in hybrid electric vehicles, electric vehicles, and hydrogen fuel cell vehicles are gradually expanding worldwide in recent years.

One of the key components of such an electric power based vehicle is a driving motor.

At present, the structure of a conventional engine vehicle is used, and the motor takes the place of the engine to provide power. However, in terms of efficiency, it is better than an engine vehicle, but has not yet achieved a specific function of an electric vehicle due to its low efficiency. The reason is that a transmission system to be applied to an electric motor has not been developed properly.

In particular, in the case of an in-wheel motor, it can operate independently of a body structure of a vehicle, and therefore, a driving force of each wheel may be controlled by removing a powertrain component such as an engine. Since it is disposed on each wheel to independently control the driving force, power loss is minimized to help to improve environment and improve performance. Furthermore, the center of gravity may move to the lower part, thereby increasing safety as well as enhancing efficiency when manufacturing a vehicle as well as reducing its body weight. In addition, as the number of parts disposed thereinside is reduced, the interior space can be further secured.

At present, major electric vehicle companies have not developed a transmission for an electric vehicle and have been using a motor with only a speed reducer added thereto. With the speed reducer alone, it significantly decreases hill climbing ability, lowers energy efficiency since the motor is driven at an excessive speed when driving at a high or constant speed, decreases mileage, and increases battery consumption.

A planetary gear has been widely used in the vehicle speed reducer from the past. In particular, it is employed in an automatic transmission of an engine vehicle to secure durability and performance. However, in order to eliminate shifting shock, the number of parts included therein, such as a clutch, a torque converter, and a synchronizer, is large, and a hydraulic system for driving them is required, increasing the size and weight of the parts. Moreover, energy efficiency is also inevitably lowered significantly.

In the case of an electric vehicle, when a large and high-performance motor is used to achieve a large driving torque required for acceleration and hill driving and a sufficient speed at high speed and, energy efficiency decreases, requiring a larger battery. Accordingly, problems have arisen due to an increase in the price and weight of the electric vehicle.

The electric motor has an advantage capable of generating a large torque even at a low RPM. Besides, it may operate at a high RPM in a short period of time. An output of the motor is increased by using a gear ratio with a large reduction ratio at a low speed of the vehicle, and a rotational speed thereof may be maintained within an efficient range by using a gear ratio with a small reduction ratio at a high or constant speed, thereby increasing energy efficiency.

Since the transmission of the electric vehicle has good speed/torque characteristics of a motor, it can be simply manufactured without employing a structure of a transmission for an engine vehicle in the related art. In particular, in the case of an in-wheel motor, compactness is essentially required in order to place it in a limited space.

DISCLOSURE OF INVENTION

Technical Problem

The present disclosure describes an electric motor with an integral gearbox capable of controlling a shift function integrated into an electric motor that is a motive power of an electric vehicle.

Solution to Problem

An electric motor with an integral gearbox according to an aspect of the present disclosure may include a stator provided with a first member disposed on an inner circumferential surface of an enclosure to generate an electromagnetic force, a rotor provided with a second member disposed on an outer circumferential surface to face an inner circumferential surface of the stator to generate an electromagnetic force together with the first member, a gear assembly provided inside the rotor, and a control unit that controls the gear assembly, wherein the gear assembly includes one or more gear plates that rotate as the rotor rotates, a connecting gear disposed to be selectively coupled to any one of the one or more gear plates, a moving part that moves the connecting gear to a desired gear plate position, and an output shaft that rotates together as the connecting gear rotates to transmit a rotational force to the outside, and the control unit controls the moving part according to a shift signal to allow the connection gear to be coupled to or decoupled from any one of the one or more gear plates.

In the electric motor with an integral gearbox according to an aspect of the present disclosure, the first member may a coil part to which a current is applied, and the second member may be a magnet.

In the electric motor with an integral gearbox according to an aspect of the present disclosure, the one or more gear plates may include at least one satellite gear, and may include a first gear plate rotating at a speed slower than a rotational speed of the rotor, a second gear plate rotating at a speed higher than that of the first gear plate, and a third gear plate rotating at a speed higher than that of the second gear plate.

In the electric motor with an integral gearbox according to an aspect of the present disclosure, the one or more gear plates may include a connecting part having an inner circumferential surface in a concavoconvex shape to allow coupling to the connection gear.

In the electric motor with an integral gearbox according to an aspect of the present disclosure, the one or more gear plates may include one or more satellite gears, and may include a fourth gear plate including a carrier rotating at a speed slower than a rotational speed of a carrier of the first gear plate, and a fifth gear plate including one or more satellite gears and including a central gear rotating at a speed higher than a rotational speed of the central gear of the third gear plate.

In the electric motor with an integral gearbox according to an aspect of the present disclosure, the gear plate may include a first satellite gear disposed in engagement with a gear tooth disposed inside the rotor, and a central gear or carrier rotating in engagement with the first satellite gear, which is disposed with a coupling hollow disposed to allow the connection gear to be coupled thereto.

In the electric motor with an integral gearbox according to an aspect of the present disclosure, the satellite gear may further include a second satellite gear in engagement with the first satellite gear to rotate according to the rotation of the first satellite gear, and the central gear may rotate in engagement with the second satellite gear.

In the electric motor with an integral gearbox according to an aspect of the present disclosure, the gear plate to which the connecting gear is not connected among the one or more gear plates may be configured to release the fixing of the central gear fixed to the enclosure when the gear plate is a speed reduction gear.

Furthermore, in the electric motor with an integral gearbox according to an aspect of the present disclosure, in the case of a speed increasing gear, the fixing of the gear plate carrier fixed to the enclosure may be released to not perform a speed increase function, thereby extending the life of the gear and reducing the load.

In the electric motor with an integral gearbox according to an aspect of the present disclosure, at least one of the one or more gear plates may include a neutral region provided between adjacent gear plates, and disposed with a hollow having an inner diameter larger than an outer circumference of the connecting gear.

In the electric motor with an integral gearbox according to an aspect of the present disclosure, the neutral region may be disposed to protrude from any one of the one or more gear plates.

In the electric motor with an integral gearbox according to an aspect of the present disclosure, the connecting gear may be fitted to the output shaft, and the electric motor may include a moving part in which the connecting gear is connected to any one of the one or more gear plates to control the movement of the connecting gear to allow the output shaft to rotate.

In the electric motor with an integral gearbox according to an aspect of the present disclosure, when moving by the moving part to be connected to any one of the one or more gear plates in the neutral region, the connected gear plate may rotate at a speed close to that of the connecting gear to be easily coupled to the connecting gear.

In the electric motor with an integral gearbox according to an aspect of the present disclosure, the moving part may be disposed with a thread on one side of the connecting gear, and may include a bevel gear, an encoder, and a moving motor. The bevel gear may rotate in engagement with a thread disposed on the moving rod to move the connecting gear along an axial direction. The encoder may determine the position and movement distance of the connecting gear, and the movement motor may rotate the bevel gear.

In the electric motor with an integral gearbox according to an aspect of the present disclosure, rotation limiting surfaces that are flat on both sides may be provided in a threaded region of the moving rod, and the moving rod is configured to move linearly as the bevel gear rotates by the rotation limiting surfaces.

In the electric motor with an integral gearbox according to an aspect of the present disclosure, the moving part may be fixed so as not to move along the axial direction when there is no rotation of the moving motor.

In the electric motor with an integral gearbox according to an aspect of the present disclosure, the connecting gear may be coupled to the moving part, the connecting gear may be fitted to the output shaft to rotate together, and the moving part may move the connecting gear in a linear direction without being rotated by the flat rotation limiting surfaces when the connecting gear and the output shaft rotate.

Advantageous Effects of Invention

In an electric motor with an integral gearbox according to an embodiment of the present disclosure, when a connecting gear is moved by a moving part to be connected to any one of one or more gear plates in a neutral region, the gear plate may rotate at a speed close to that of the connecting gear. Through this, a shock that may occur when the connecting gear is connected to the rotating gear plate may be reduced.

The electric motor with an integral gearbox according to an embodiment of the present disclosure may include a gear assembly having a shift function inside a rotor, resulting in that it is not required to separately provide a transmission at the outside, thereby having an advantage capable of reducing a size of the electric motor.

The electric motor with an integral gearbox according to an embodiment of the present disclosure may implement an electric motor having multiple gears having five or more stages inside the rotor, thereby implementing a motor capable of achieving high efficiency and high output in a smaller space.

Furthermore, the electric motor with an integral gearbox according to an embodiment of the present disclosure may add a gear box without increasing a size of the motor. Accordingly, the size and weight may be reduced to allow long-distance driving even with a battery of the same capacity, thereby improving battery efficiency.

In addition, the electric motor with an integral gearbox according to an embodiment of the present disclosure may be manufactured in a small size, thereby having an advantage of facilitating use as an in-wheel motor. In the case of an in-wheel motor, an outer diameter of the motor may be made large according to a wheel size, thereby allowing the motor with a large output to be mounted without burdening a size of the motor.

MODE FOR THE INVENTION

Figure 1:
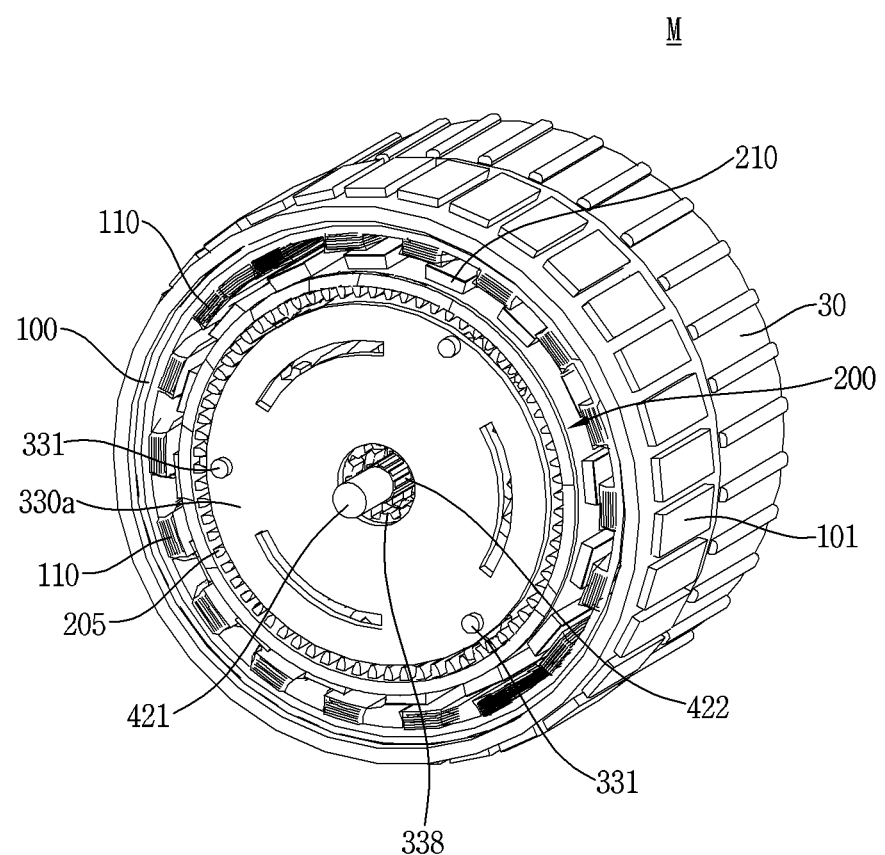
FIGS. 1 and 2 are perspective views showing an electric motor with an integral gearbox according to an embodiment of the present disclosure.

As the present disclosure may be applied with various changes and provided with various embodiments, specific embodiments will be illustrated and described in detail. However, those specific embodiments should not be construed to limit the present disclosure, and should be construed as being extended to all changes, equivalents, and substitutes included in the concept and technological scope of the invention.

It should be noted that the terms used herein are merely used to describe a specific embodiment, but not to limit the present disclosure. A singular expression includes a plural expression unless the context clearly indicates otherwise. Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Hereinafter, preferred embodiments of the present disclosure will be described in detail with reference to the accompanying drawings. Here, it should be noted that in the accompanying drawings, the same components are denoted by the same reference numerals as much as possible. Furthermore, detailed descriptions of well-known functions and configurations that may obscure the gist of the present disclosure will be omitted. For the same reason, some components are exaggerated, omitted, or schematically illustrated in the accompanying drawings.

Figure 2:
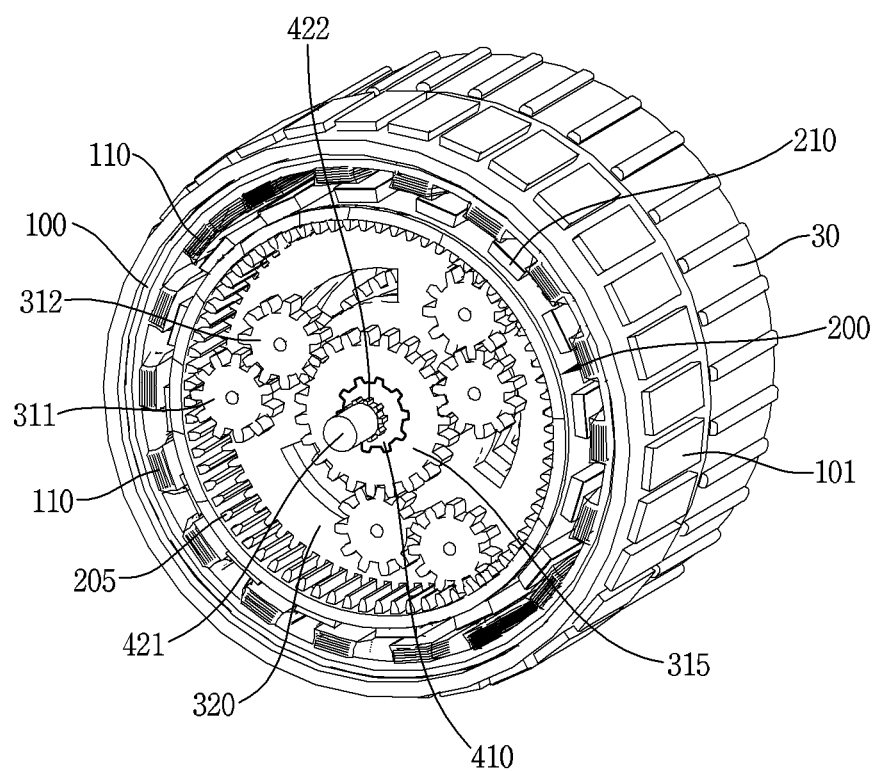
Figure 3:
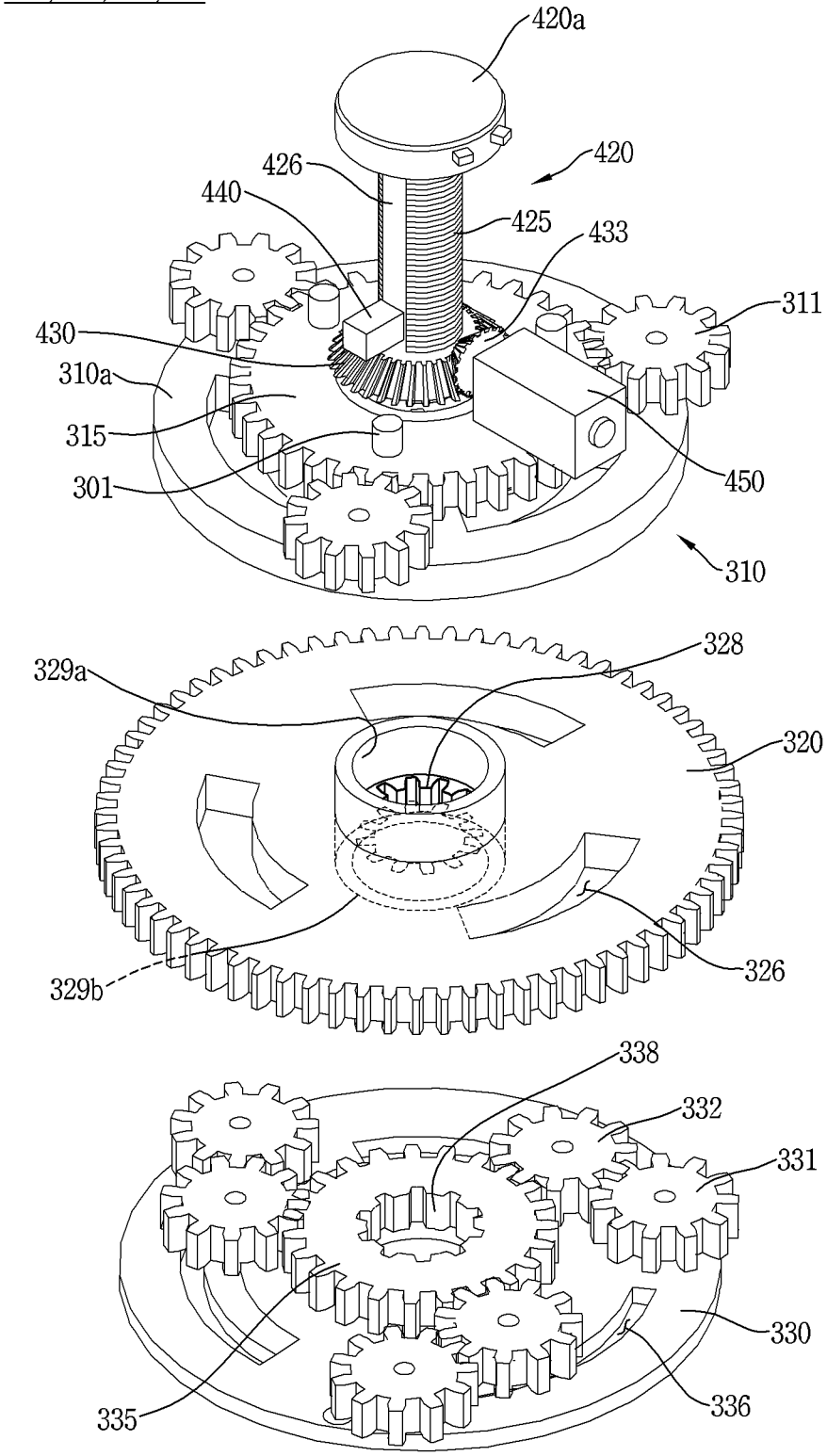
FIG. 3 is an exploded perspective view in which a transmission portion of the electric motor with an integral gearbox in FIG. 1 is disassembled.

FIGS. 1 and 2 are perspective views showing an electric motor with an integral gearbox according to an embodiment of the present disclosure. FIG. 3 is an exploded perspective view of a transmission on a drawing in which the electric motor with an integral gearbox in FIG. 1 is disassembled. FIGS. 4 to 9 are perspective views showing some components in order to explain an electric motor with an integral gearbox according to an embodiment of the present disclosure.

In the present disclosure, as an example, a planetary gear will be described as an embodiment, but the planetary gear may be modified for use, and a method other than the planetary gear may also be used. In addition, although speed reduction is commonly used in general, speed increase and uniform speed are also added to better explain the embodiment.

Furthermore, unlike an embodiment of the present disclosure, only one gear plate may be provided. For example, only one gear plate may be provided in the gearbox. Since a rotational speed of the rotor of the electric motor may rotate very quickly within a short period of time, the gear plate may be used to reduce a rotational speed of the rotor.

An electric motor M with an integral gearbox according to an embodiment of the present disclosure may be provided in a transportation means such as a vehicle using the electric motor. In particular, since the electric motor is small in size and easy to control, it is less restricted by space and thus may be disposed close to a wheel of the vehicle.

The electric motor M with an integral gearbox according to an embodiment of the present disclosure may include a stator 100, a rotor 200, a gear assembly GA, and a control unit 400.

Specifically, referring to FIGS. 1 and 2, the stator 100 may be disposed to surround at least a portion of the electric motor M with an integral gearbox. An additional cover surrounding the motor and the like may be further provided on an outer surface of the stator 100.

The stator 100 includes a first member disposed on an inner circumferential surface of the stator 100 to generate an electromagnetic force. The stator 100 does not rotate. The rotor 200 to be described later may be rotated by electromagnetic force applied to the first member and to a second member to be described later. Meanwhile, a heat sink 101 may be provided in an enclosure surrounding the stator 100. The rotor 200 is disposed on an outer circumferential surface to face an inner circumferential surface of the stator 100, and the second member for generating an electromagnetic force together with the first member is provided therein. As the rotor 200 rotates, the first member and the second member are repeatedly driven to approach and move away from each other. The rotor 200 may be rotated by an electromagnetic force formed between the first member and the second member.

A gear tooth 205 may be disposed inside the rotor 200. One or more gear plates 300 may be connected to the gear tooth 205 of the rotor 200 to rotate. That is, as the rotor 200 rotates, one or more gear plates 300 disposed inside the rotor 200 may rotate.

On the other hand, the first member of the stator 100 may be a coil to which a current is applied, and the second member of the rotor 200 may be a magnet. Furthermore, unlike the foregoing description, the first member may be a magnet, and the second member may be a coil to which a current is applied.

In addition, unlike the above-described embodiment, the positions of the stator 100 and the rotor 200 may be exchanged with each other. In this case, the rotor 200 may be disposed to be larger in length compared to the stator 100. Furthermore, one or more gear plates 300 may be connected to the gear tooth disposed inside the rotor 200 to rotate. In addition, a rotation shaft may be disposed at the center of the rotor and the gear tooth may be disposed on an inner surface of the stator, and then one or more gear plates may be provided therein to perform shifting.

The gear assembly GA is provided inside the rotor 200. Specifically, the gear assembly GA may be provided inside the rotor 200 to shift the gear of the motor.

Referring to FIGS. 2 and 3, the gear assembly GA includes one or more gear plates 300, a connecting gear 410, a moving part 420, and an output shaft 421.

A plurality of gear plates may be disposed in parallel to one another. Each of the gear plates is configured to rotate as the rotor 200 rotates.

Specifically, the one or more gear plates 300 may include a first gear plate 310, a second gear plate 320, and a third gear plate 330. In this case, the first gear plate 310 and the third gear plate 330 may include one or more satellite gears and carriers for fixing the satellite gears.

Figure 7:
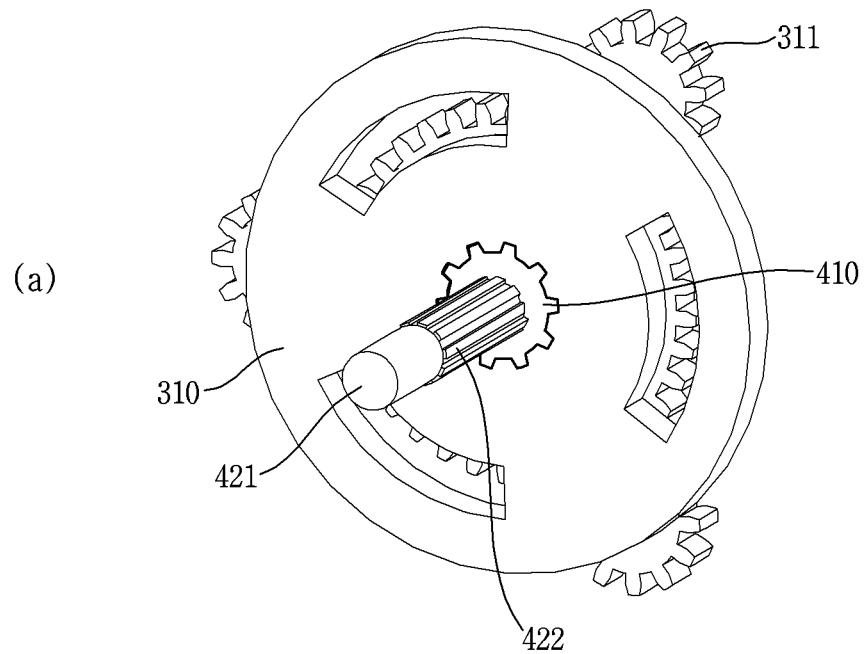
Figure 7:
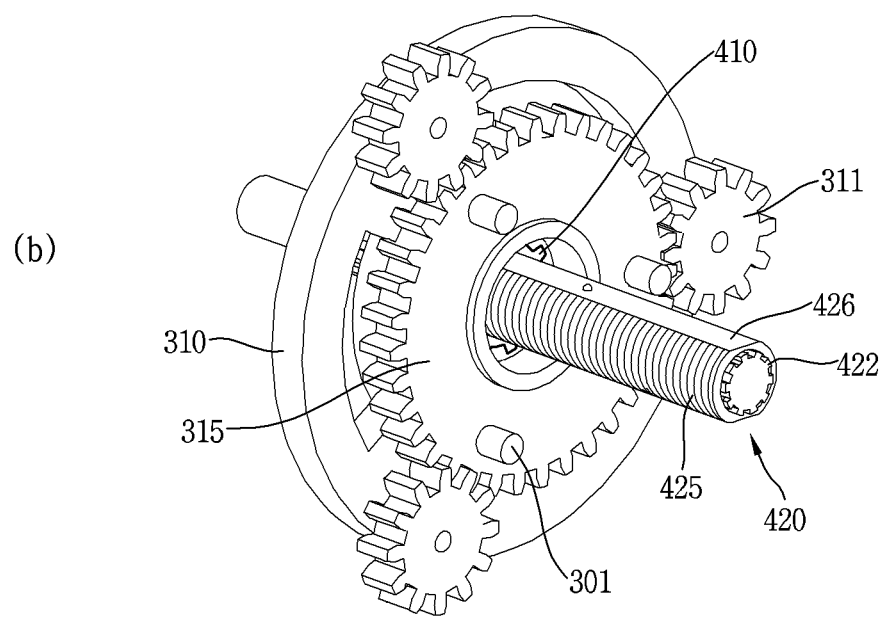

(a) and (b) of FIG. 7 are views showing states in which the connecting gear 410 and the first gear plate 310 are connected, which are viewed from different directions.

The first gear plate 310 may include one or more satellite gears, and a gear plate carrier 310a rotating at a speed slower than a rotational speed of the rotor 200.

Specifically, referring to FIG. 3, the first gear plate 310 may include a first satellite gear 311, a central gear 315, and a first gear plate carrier 310a.

The first satellite gear 311 is disposed to be connected to the internal gear tooth 205 of the above-described rotor 200. That is, the first satellite gear 311 may be disposed in engagement with the gear tooth disposed inside the rotor 200. Accordingly, the first satellite gear 311 may directly rotate as the rotor 200 rotates.

The central gear 315 is disposed in engagement with the first satellite gear 311, and fixed to the enclosure by a pin 301.

At the center of the central gear 315, the connecting gear 410 may pass therethrough, and may be disposed with a neutral region in which a connection between the connecting gear 410 and the first gear plate 310 is released.

Furthermore, a coupling hollow may be disposed inside the first gear plate carrier 310a.

Figure 8:
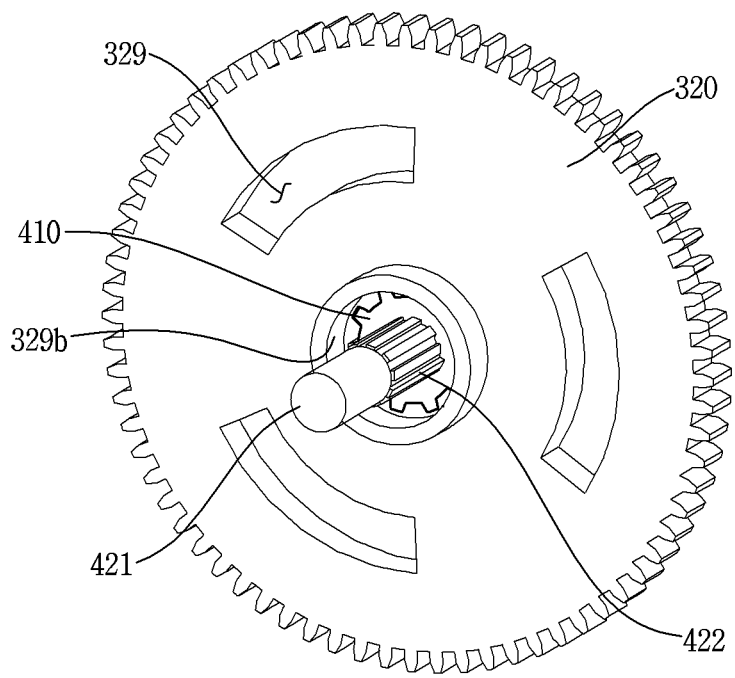

FIG. 8 shows a state in which the second gear plate 320 and the connecting gear 410 are connected to each other.

The second gear plate 320 may rotate at the same speed as that of the rotor 200. Specifically, as a gear tooth disposed on an outer circumferential surface of the second gear plate 320 and a gear tooth disposed on an inner circumferential surface of the rotor 200 rotate in engagement with each other, the second gear plate 320 may rotate at the same speed as a rotational speed of the rotor 200.

Figure 4:
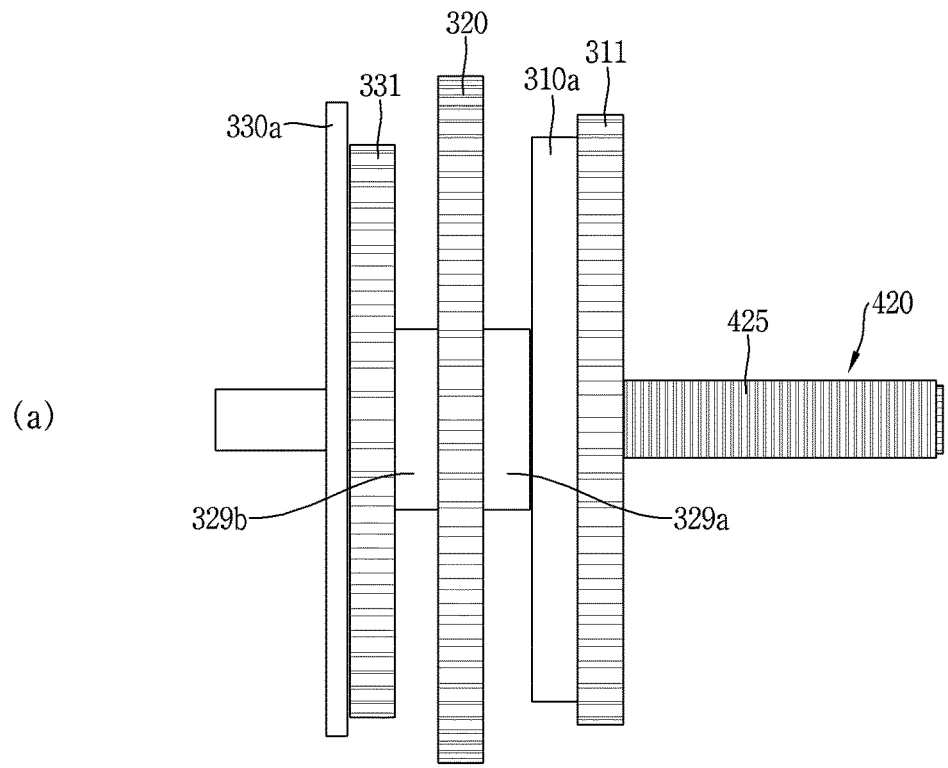
FIGS. 4 to 9 are perspective views showing some components in order to explain an electric motor with an integral gearbox according to an embodiment of the present disclosure.
Figure 4:
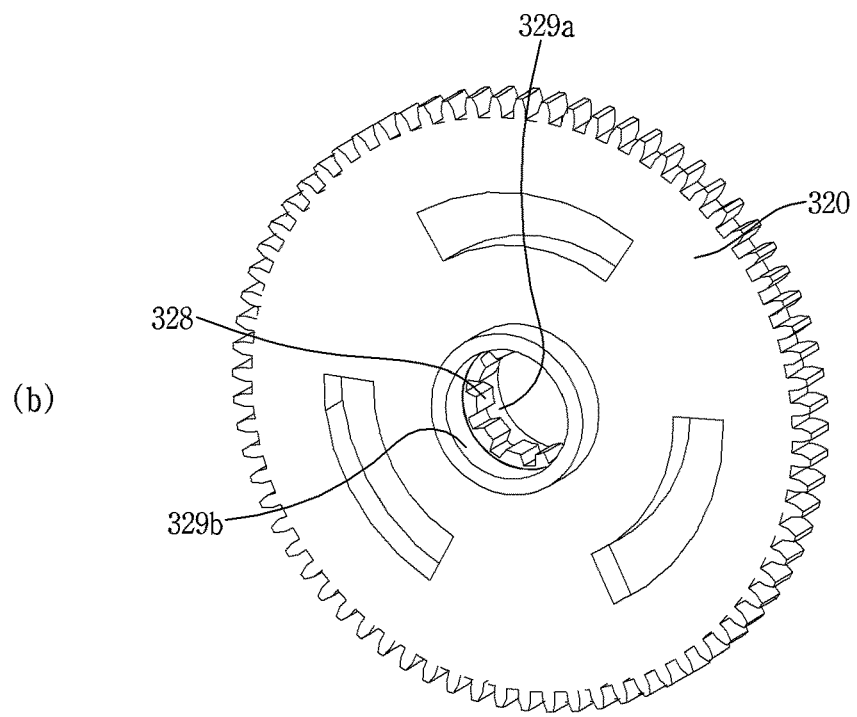

Referring to (b) of FIG. 4, the second gear plate 320 may include neutral regions 329 disposed to protrude toward the first gear plate 310 and the third gear plate 330. Specifically, referring to (b) of FIG. 4, a first neutral region 329a and a second neutral region 329b protruding from both sides are disposed around a connecting part 328 of the second gear plate 320. However, for design reasons, only one neutral region may be provided in the second gear plate 320.

Figure 6:
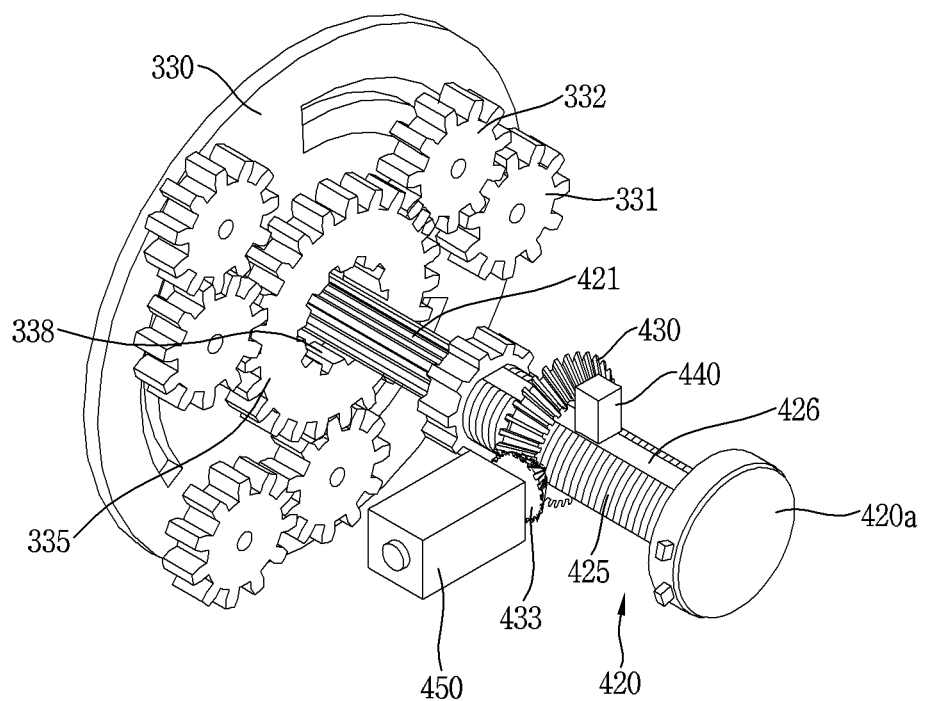

Referring to FIG. 6, the third gear plate 330 may include one or more satellite gears and a central gear 335 rotating at a speed higher than the rotational speed of the rotor 200.

Figure 9:
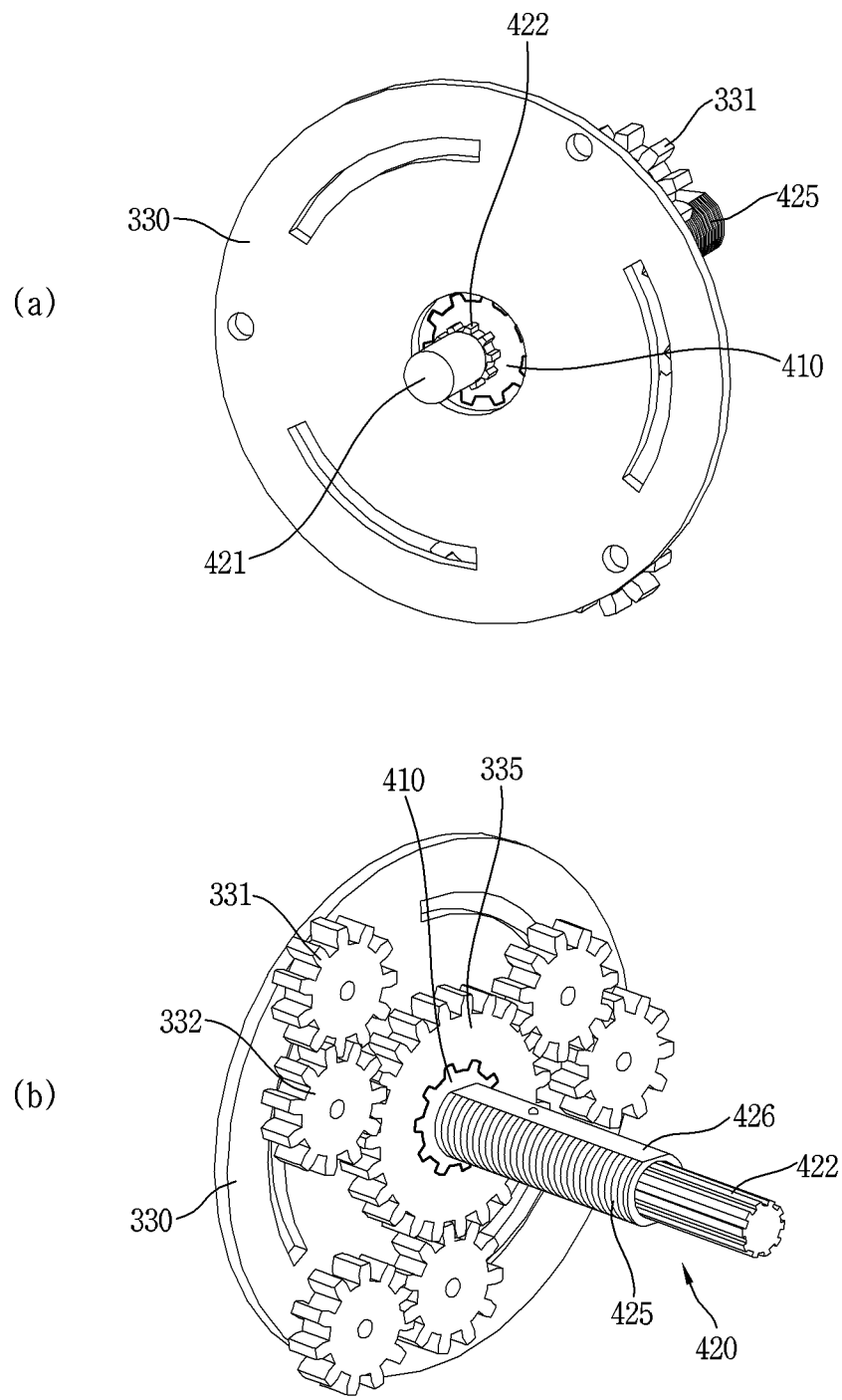

(a) and (b) of FIG. 9 are views showing states in which the third gear plate 330 and the connecting gear 410 are connected, which are viewed from different directions. The third gear plate 330 may include a first satellite gear 331, a second satellite gear 332, and the central gear 335.

The first satellite gear 331 rotates in engagement with the rotor 200. That is, the first satellite gear 331 and an inner gear tooth of the rotor 200 may rotate in engagement with each other. In addition, the second satellite gear 332 may be engaged with the first satellite gear 331 to rotate according to the rotation of the first satellite gear 331. In addition, the central gear 335 may rotate in engagement with the second satellite gear 332.

That is, a rotational force transmitted from the rotor 200 may be transmitted to the connecting gear 410 through the first satellite gear 331, the second satellite gear 332, and the central gear 335 of the third gear plate 330. At this time, a diameter of the central gear 335 may decreases as the first satellite gear 331 and the second satellite gear 332 are disposed therewith. Since the diameter of the central gear 335, when the rotor 200 rotates once, the central gear 335 of the third gear plate 330 may rotate more than that.

Referring to FIG. 2, the connecting gear 410 connected to the third gear plate 330 may also rotate more than that. Accordingly, the output shaft 421 connected to the connecting gear 410 may rotate more.

Referring to FIG. 1, the third gear plate 330 may include a third gear pin 331 to be fixed to a cover of the electric motor. The third gear pin 331 may fix the third gear plate carrier 330a to the cover of the electric motor.

Referring to (a) of FIG. 4, the gear assembly GA includes the first gear plate 310, the second gear plate 320 and the third gear plate 330 that are arranged side by side a second gear plate 310 toward one side starting from a threaded portion of the moving part 420. The first neutral region 329a may be disposed between the first gear plate 310 and the second gear plate 320, and the second neutral region 329b may be dispose between the second gear plate 320 and the third gear plate 330. Furthermore, a neutral region may also be disposed on an inner circumferential surface of the central gear 315 of the first gear plate 310.

Each of the one or more gear plates 300 described above may include a connecting part having an inner circumferential surface in a concavoconvex shape to allow coupling to the connecting gear 410.

Specifically, an inner circumferential surface of the central gear 315 may be a connecting part 318. However, in the case of the second gear plate 320, the central gear is not provided, and the connecting part 328 may be disposed in the second gear plate carrier 320a.

The connecting part of each gear plate may rotate the connecting gear 410 with a rotational force transmitted from the rotor 200 by coupling an outer circumferential surface of each gear plate and the connecting gear 410. Through this, a rotational force may be transmitted to the output shaft 421 connected to the connecting gear 410.

Meanwhile, the carrier 330a or the central gear 315 of the gear plate to which the connecting gear 410 is not connected among the one or more gear plates 300 may be released from the fixing to the enclosure.

For example, when the connecting gear 410 is connected to the first gear plate 310, the third gear plate carrier 330a of the third gear plate 330 may be released from the fixing to the enclosure. Specifically, since a pin connecting the third gear plate carrier 330a and the enclosure to each other is released, it may rotate at the same rotational speed as that of the rotor without performing a speed increase function. Accordingly, a driving force applied to the third gear plate 330 may be reduced, thereby reducing a load applied to the rotor 200 as well as increasing a life of the gear.

At least one of the one or more gear plates 300 according to an embodiment of the present disclosure may include a neutral region provided between adjacent gear plates, and disposed with a hollow having an inner diameter larger than an outer circumference of the connecting gear 410.

The neutral region may be disposed to protrude from any one of the one or more gear plates 300. Referring to FIG. 3, the second gear plate 320 may include two neutral regions protruding from both sides of the second gear plate 320. Specifically, the second gear plate 320 may include the first neutral region 329a protruding toward the first gear plate 310 and the second neutral region 329b protruding toward the third gear plate 330. In addition, in the case of the first gear plate 310, a neutral region is included on an inner surface of the central gear 315.

Meanwhile, the electric motor M with an integral gearbox according to an embodiment of the present disclosure may include a moving part 420. The moving part 420 may be moved so that the connecting gear 410 is connected to any one of the one or more gear plates 300. In this case, the control unit 400 may move the moving part 420 by a signal. The moving part 420 will be described later in detail.

The connecting gear 410 may be disposed to be selectively coupled to any one of the one or more gear plates 300. The connecting gear 410 is disposed with a gear tooth on an outer circumferential surface thereof so as to be coupled to the connecting part of each gear plate described above.

The connecting gear 410 is fitted to the output shaft 421. That is, the connecting gear 410 may be disposed to be movable along the output shaft 421. Therefore, as the connecting gear 410 is coupled to the gear plate to rotate, the output shaft 421 rotates together therewith to transmit a rotational force to the outside.

Furthermore, the output shaft 421 may be connected to a wheel of the vehicle. In addition, the connecting gear 410 may be connected to the output shaft 421. Accordingly, the rotation of the wheel of the vehicle may be the rotation of the connecting gear 410. Furthermore, the rotation of the connecting gear 410 may be the rotation of the output shaft 421.

An encoder 420a for detecting a rotational speed may be disposed at one side of the output shaft 421. The encoder 420a for detecting a rotational speed may detect a rotational speed of the output shaft 421 rotating inside a moving rod 425.

In addition, the moving rod 425 has the output shaft 421 therein. The output shaft 421 may extend beyond a threaded region. In addition, the connecting gear 410 may be fitted into an output shaft groove 422 (refer to FIG. 7).

On the other hand, when the connecting gear 410 is moved by the moving part 420 so as to be connected to any one of the one or more gear plates 300 in the neutral region, the gear plate is instantaneously accelerated or decelerated to be close to a rotational speed of the connecting gear 410. This is to match the rotational speed of the gear plate at a speed close to that of the connecting gear 410 connected thereto. Through this, the rotational speed of the gear plate to which the connecting gear 410 is to be connected is similar to that of the gear plate, thereby allowing the connecting gear 410 and the gear plate to be easily coupled to each other.

At this time, the rotational speed of the rotor 200 may vary according to the gear plate to which the connecting gear 410 is to be connected. This is because it is a rotational speed required for a connecting part of each gear plate to be connected to the connecting gear 410 without shifting shock.

For example, assuming that the connecting gear 410 rotates at a constant speed, the rotational speed of the rotor 200 required to be connected to the first gear plate 310 is greater than that of the rotor 200 required to be connected to the second gear plate 320 and the third gear plate 330.

When the rotor 200 rotates at the same speed of 1 while the connecting gear 410 is connected to the first gear plate 310, the second gear plate 320 and the third gear plate 330, a rotational speed transmitted to the connecting gear 410 may be 0.5, 1, and 2, respectively.

On the contrary, when the speed of the connecting gear 410 is equally 1, the rotational speed of the rotor 200 required for the connecting gear 410 to be connected to the first gear plate 310, the second gear plate 320 and the third gear plate 330 may be 2, 1 and 0.5, respectively.

Figure 5:
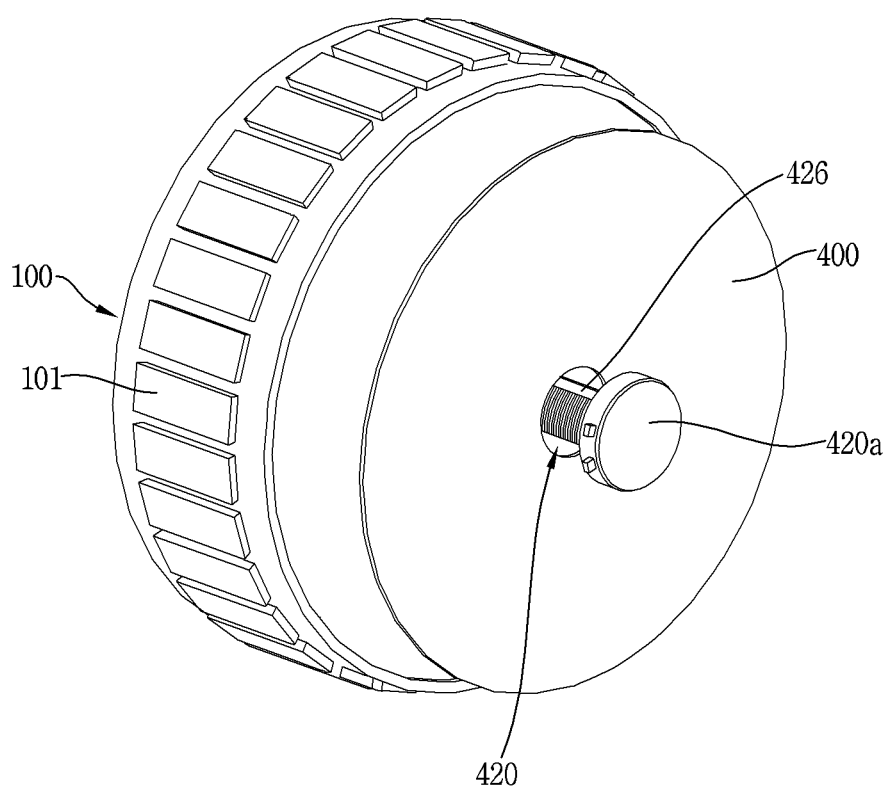

Referring to FIG. 5, the control unit 400 may be disposed between the output shaft 421 and the gear assembly GA. The control unit 400 controls the gear assembly GA. Specifically, the control unit 400 selects gears connected to the output shaft 421 in the gear assembly GA for shifting to control the connection.

The control unit 400 may control the moving part 420 such that the coupling gear 410 is coupled to any one of the one or more gear plates 300 or the coupling thereto is released according to a shift signal.

The gear plate shown in the example is a planetary gear set including a central gear, a satellite gear, and a carrier. In this case, a gear machined on an inner circumferential surface of the rotor serves as a ring gear which is an input of the planetary gear. Furthermore, in the case of a speed reduction gear, the central gear is fixed and the connecting part is disposed on the carrier to be used as an output of the gear plate, and on the contrary, in the case of a speed increasing gear, the carrier is fixed and the connecting part is disposed at the central gear to be used as the output of the gear plate.

When the connecting gear 410 is positioned in the neutral region 329 and the connecting gear 410 receives a signal for coupling to a specific gear plate, the control unit 400 may control the electric motor M with an integral gearbox as follows. The control unit 400 may recognize to which gear plate the connecting gear 410 is connected, and then rotate the rotor 200 to allow the rotational speed of the connecting part of the corresponding gear plate and the rotational speed of the connecting gear 410 to be close to each other.

Referring to FIG. 6, the moving part 420 may be threaded on one side of the connecting gear 410. The thread of the moving part 420 is caught by a bevel gear 430 to allow the moving part 420 to move in an axial direction according to the rotation of the bevel gear.

The threaded region of the moving part 420 may be provided with rotation limiting surfaces 426 that are flat on both sides thereof. Specifically, the rotation limiting surfaces 426 may be disposed in parallel to both sides of the moving part 420 in a region where the moving part 420 is threaded.

The rotation limiting surfaces 426 are not caught in a screw groove disposed on an inner surface of the foregoing bevel gear 430. Furthermore, it passes through a groove in the form of the rotation limiting surfaces 426 in the enclosure. Accordingly, since the rotation limiting surfaces 426 are disposed on the moving part 420, it may not rotate even when the bevel gear 430 rotates. That is, the thread and the rotation limiting surfaces 426 are disposed around the moving part 420, it may perform a linear movement rather than a rotational movement when the bevel gear 430 rotates.

On the other hand, a fixing device 440 for fixing the moving part 420 may be made to fix the movement of the moving part 420 so that the moving part 420 does not move along an axial direction when there is no rotation of a moving motor 450. Specifically, when the connecting gear 410 is connected to a specific gear plate to rotate, the movement of the moving part 420 connected to the connecting gear 410 needs to be limited. Accordingly, while the connecting gear 410 is connected to a specific gear plate to rotate, the fixing device 440 may limit the movement of the moving part 420 so as to prevent the connecting gear 410 from moving along the axial direction of the output shaft 421.

The moving part 420 may include the moving rod 425, the bevel gear 430, the encoder (for checking a moving position), and the moving motor 450.

The bevel gear 430 may rotate by the moving motor 450. A groove disposed in engagement with a thread disposed on the moving part 420 may be disposed on an inner surface of the bevel gear 430.

As the bevel gear 433 rotates, the bevel gear 430 attached to the moving part 420 may rotate, and the bevel gear 430 may be engaged with the thread disposed on the moving part 420 to move the moving part 420 in an axial direction. As the moving part 420 moves along the axial direction, the connecting gear 410 connected to the moving part 420 may be connected to or separated from any one of the one or more gear plates 300.

The encoder may store the position and movement distance of the connecting gear 410. The encoder may be included inside the moving motor 450 to be described later. In addition, the stored position and movement distance of the connected gear 410 may be transmitted to the control unit 400. Accordingly, the control unit 400 may recognize to which gear plate the connecting gear 410 is connected or disconnected. That is, the control unit 400 may determine the position of the connecting gear 410.

The moving motor 450 may rotate the bevel gear 430 as power is driven. Accordingly, the moving part 420 may move along the axial direction.

The electric motor M with an integral gearbox according to an embodiment of the present disclosure may include the gear assembly GA having a shift function inside the rotor 200, and thus it is not required to separately provide a transmission therein, thereby having an advantage capable of reducing a size of the electric motor.

Furthermore, the electric motor with an integral gearbox according to an embodiment of the present disclosure may use a general gear, not a planetary gear type including a satellite gear. Even in this case, the gear assembly may be included inside the rotor, thereby reducing the size of the electric motor.

Meanwhile, unlike the above-described embodiment, all of the one or more gear plates may be gear plates for speed reduction. Since the rotational speed (rpm) of the rotor of the electric motor can rotate at a very high speed, the one or more gear plates may be disposed with different reduction ratios compared to the rotor.

Figure 10:
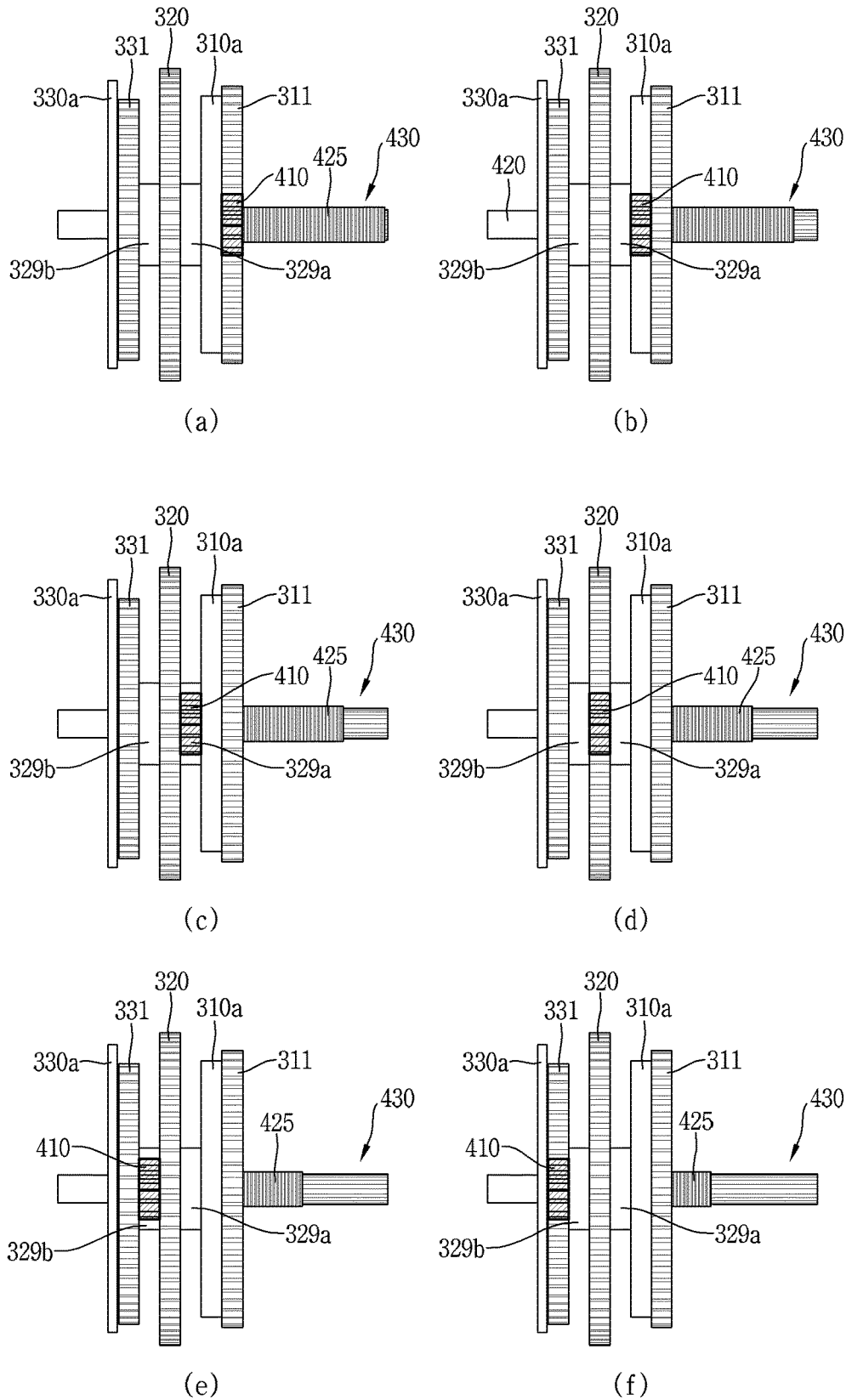
FIG. 10 is a conceptual view for explaining that an electric motor with an integral gearbox according to an embodiment of the present disclosure is shifted.

FIG. 10 is a conceptual view for explaining that the electric motor M with an integral gearbox according to an embodiment of the present disclosure is shifted.

Referring to (a) of FIG. 10, the connecting gear 410 is in a state of being disconnected from the first gear plate 310. It may be referred to as a basic state in which the shift of the motor is not driven.

Referring to (b) of FIG. 10, it is shown a state in which the connecting gear 410 is moved toward the first gear plate carrier 310a by the moving part. At this time, the connecting gear 410 is in a state of being connected to the gear plate carrier 310a of the first gear plate 310. At this time, the connecting gear 410 may rotate at an angular speed slower than the rotational speed of the rotor 200. When expressed as a vehicle gear, it may be said that the gear is disposed in a first stage.

Referring to (c) of FIG. 10, it is shown a state in which the connecting gear 410 is moved by the moving part, and the connecting gear 410 is disposed in the first neutral region 329a.

Referring to (d) of FIG. 10, it is shown a state in which the connecting gear 410 is moved by the moving part, and the connecting gear 410 is connected to the second gear plate 320. At this time, the connecting gear 410 may rotate at the same angular speed as a rotational speed of the rotor 200. When expressed as a vehicle gear, it may be said that the gear is disposed in a second stage.

Referring to (e) of FIG. 10, it is shown a state in which the connecting gear 410 is moved by the moving part, and the connecting gear 410 is disposed in the second neutral region 329b.

Referring to (f) of FIG. 10, it is shown a state in which the connecting gear 410 is moved by the moving part, and the connecting gear 410 is connected to the third gear plate 330. At this time, the connecting gear 410 may rotate at an angular speed faster than the rotational speed of the rotor 200. When expressed as a vehicle gear, it may be said that the gear is disposed in a third stage.

As described above, the connecting gear 410 may be connected to any one of the one or more gear plates 300 or disposed in a neutral region that is not connected to the gear plate.

When the connecting gear 410 is in the neutral region, the connecting gear 410 does not receive a rotational force from the gear plate, but the connecting gear 410 rotates at a speed of the wheel and the output shaft 421 since it is connected to the output shaft 421 and the wheel.

At this time, when the connecting gear 410 is moved by the moving part to be connected to any one of the one or more gear plates 300 in the neutral region, the rotational speed of the rotor 200 is controlled by the control unit 400 such that the gear plate connected to the connecting gear 410 among the gear plates can be rotated at a speed close to that of the connecting gear. Through this, a shock that may occur when the connecting gear 410 is connected to the rotating gear plate can be reduced.

Figure 11A:
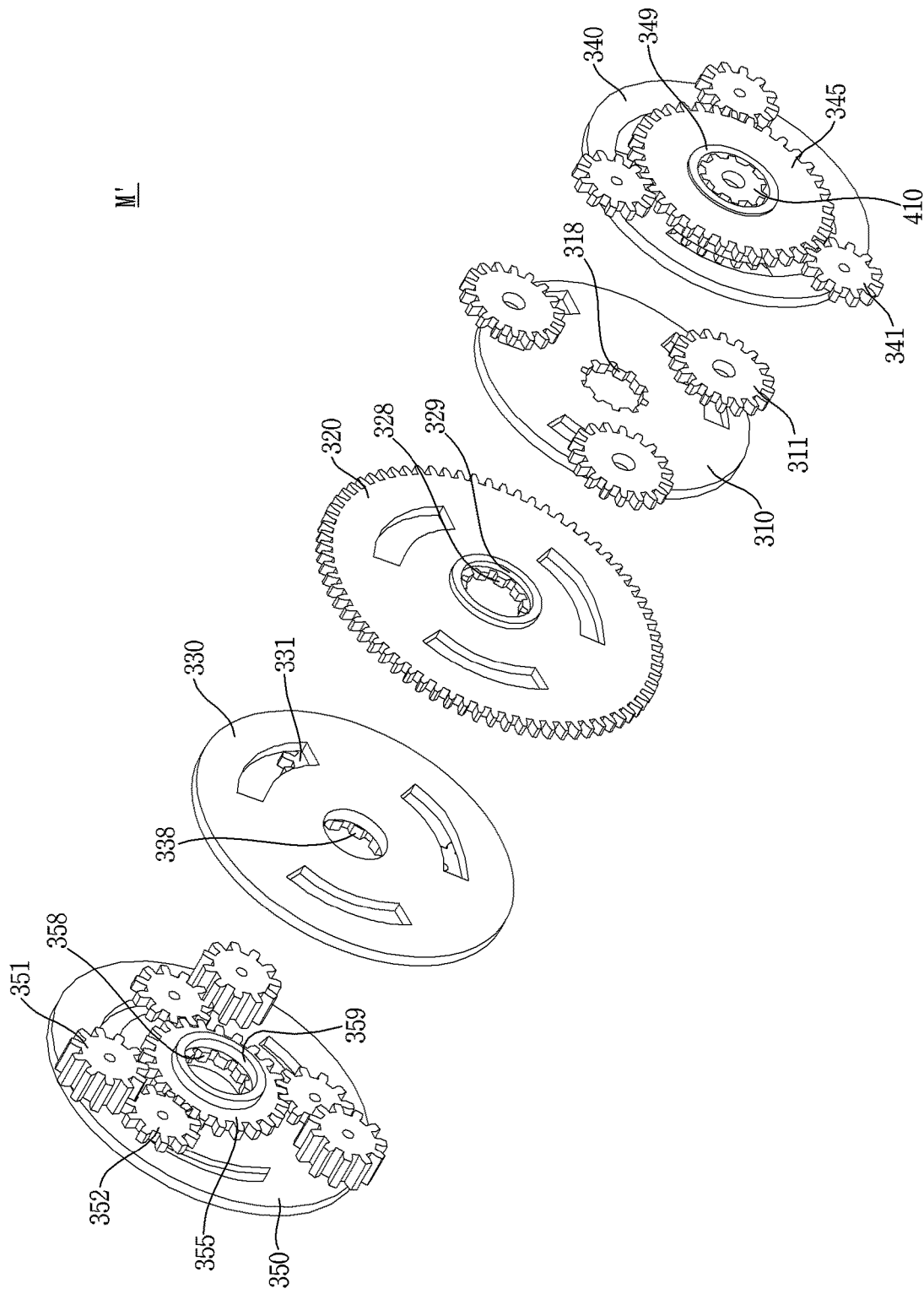
FIGS. 11A and 11B are exploded perspective views showing a transmission portion of an electric motor with an integral gearbox according to another embodiment of the present disclosure.
Figure 11B:
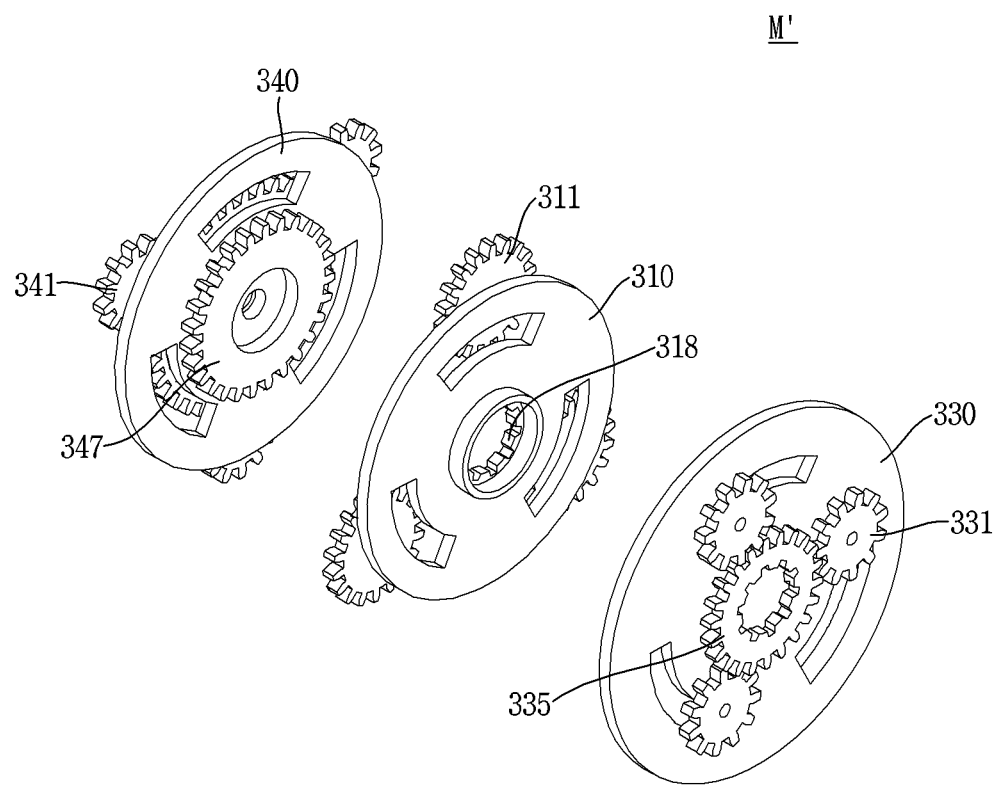
Figure 12:
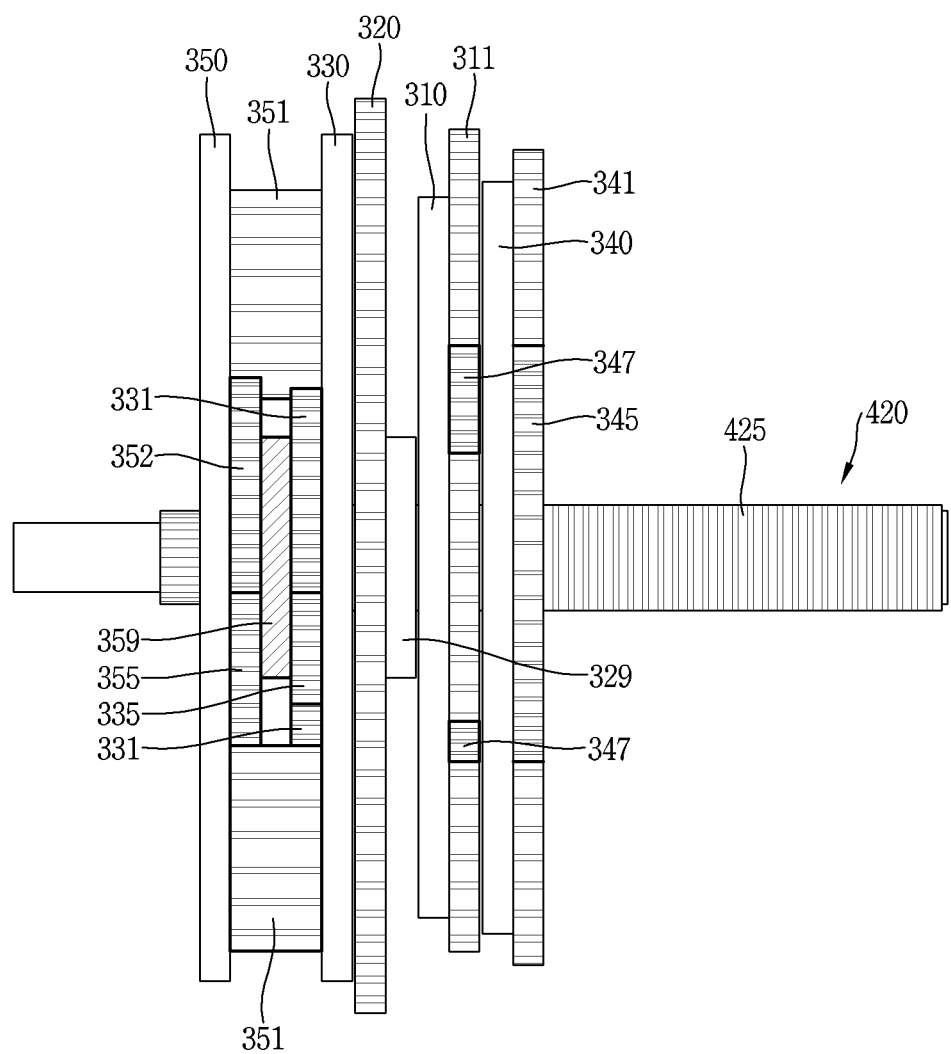
FIG. 12 is a conceptual view for explaining that the electric motor with the integral gearbox of FIGS. 11A and 11B shifts a gear.

FIGS. 11A and 11B are exploded perspective views showing a transmission of an electric motor with an integral gearbox according to another embodiment of the present disclosure. FIG. 12 is a conceptual view for explaining that the electric motor with the integral gearbox of FIGS. 11A and 11B shifts a gear.

When compared with the electric motor with an integral gearbox described in FIGS. 1 to 10, the electric motor with the integral gearbox according to the present embodiment merely differs in that it includes two more gear plates, and the other components are the same or similar, and therefore, the description of the same or similar components will be omitted.

In the foregoing embodiment, an electric motor M' with an integral gearbox may include a first gear plate 310, a second gear plate 320, and a third gear plate 330. Alternatively, a plurality of gear plates having a shape similar to that of the first gear plate 310 may be included therein.

The first gear plate 310 is a gear plate for rotating the connecting gear 410 at a low speed compared with the rotational speed of the rotor 200, and the second gear plate 320 is a gear plate for rotating the connecting gear 410 at the same speed as the rotational speed of the rotor 200. The third gear plate 330 is a gear plate for rotating the connecting gear 410 at a speed higher than the rotational speed of the rotor 200.

In this case, the one or more gear plates 300 according to an embodiment of the present disclosure may further include a fourth gear plate 340 and a fifth gear plate 350.

Referring to FIG. 11A, the fourth gear plate 340, the first gear plate 310, the second gear plate 320, the third gear plate 330, and the fifth gear plate 350 are arranged in this order. The fourth gear plate 340 is the lowest number of gear stage, and the number of gear stage increases in the order of the first gear plate 310, the second gear plate 320, the third gear plate 330, and the fifth gear plate 350.

The fourth gear plate 340 may include one or more satellite gears, and may include a central gear 345 fixed to the enclosure.

Referring to FIG. 11A, the fourth gear plate 340 may include a first satellite gear 341 and the central gear 345 disposed on one side of the fourth gear plate carrier 340a. Furthermore, referring to FIG. 11B, the fourth gear plate 340 may include a power transmission gear 347 disposed on the other side of the fourth gear plate carrier 340a.

The power transmission gear 347 may transmit a rotational force of the fourth gear plate carrier 340a to a satellite gear of the first gear plate 310. Specifically, as shown in the drawing, the power transmission gear 347 may rotate in engagement with the first satellite gear 311 of the first gear plate 310.

The first gear plate 310 may include the first satellite gear 311 and the first gear plate carrier 310a. As described above, the first satellite gear 311 may be connected to the power transmission gear 347 of the fourth gear plate 340. At this time, the power transmission gear 347 serves as a central gear of the first gear plate. The first satellite gear 311 may rotate while rotating the first gear plate carrier 310a, and the connecting part 318 may be disposed on the first gear plate carrier 310a.

The second gear plate 320 may be disposed such that the second gear plate carrier 320a itself rotates in engagement with the rotor 200. The connecting part 328 may be disposed inside the second gear plate carrier 320a.

The third gear plate 330 may include the first satellite gear 331, the central gear 335, and the third gear plate carrier 330a.

The first satellite gear 331 of the third gear plate 330 may not be connected to the rotor 200, but may be connected to the first satellite gear 351 of the fifth gear plate 350 disposed on the fifth gear plate 350. The central gear 335 of the third gear plate 330 may be connected to the first satellite gear 331 of the third gear plate 330 to rotate.

The first satellite gear 331 of the third gear plate 330 is connected to the first satellite gear 351 of the fifth gear plate 350 to rotate as the first satellite gear 351 of the fifth gear plate 350 rotates. The connecting part 338 disposed inside the central gear 335 of the third gear plate 330 may rotate as the first satellite gear 331 of the third gear plate 330 rotates, and the connecting gear 410 may be connected to the connecting part 338 of the third gear plate 330 to rotate.

The fifth gear plate 350 may include one or more satellite gears, and may include a central gear 355 rotating at a speed higher than the rotational speed of the connecting part 338 of the third gear plate 330. That is, the fifth gear plate 350 is a gear plate having a higher number of gear stage than that of the third gear plate 330.

The fifth gear plate 350 may include the first satellite gear 351, a second satellite gear 352, the central gear 355, and a fifth gear plate carrier 350a. In this case, in order to perform a speed increasing operation, the fifth gear plate carrier 350a is fixed to the enclosure.

The first satellite gear 351 of the fifth gear plate 350 is connected to the rotor 200 to receive a rotational force. The rotational force received by the first satellite gear 351 may be transmitted to the second satellite gear 352, and the second satellite gear 352 may rotate the central gear 355 of the fifth gear plate 350. The connecting gear 410 may be connected to the connecting part 358 disposed on an inner circumferential surface of the central gear 355 of the fifth gear plate 350.

Meanwhile, as described above, the first satellite gear 351 of the fifth gear plate 350 may be made to be thick. Accordingly, the first satellite gear 351 of the fifth gear plate 350 may rotate the first satellite gear 331 of the third gear plate 330.

The electric motor M' with an integral gearbox according to an embodiment of the present disclosure implements an electric motor having five or more multiple gears inside the rotor 200, thereby implementing a motor capable of high efficiency in a smaller space.

Figure 13:
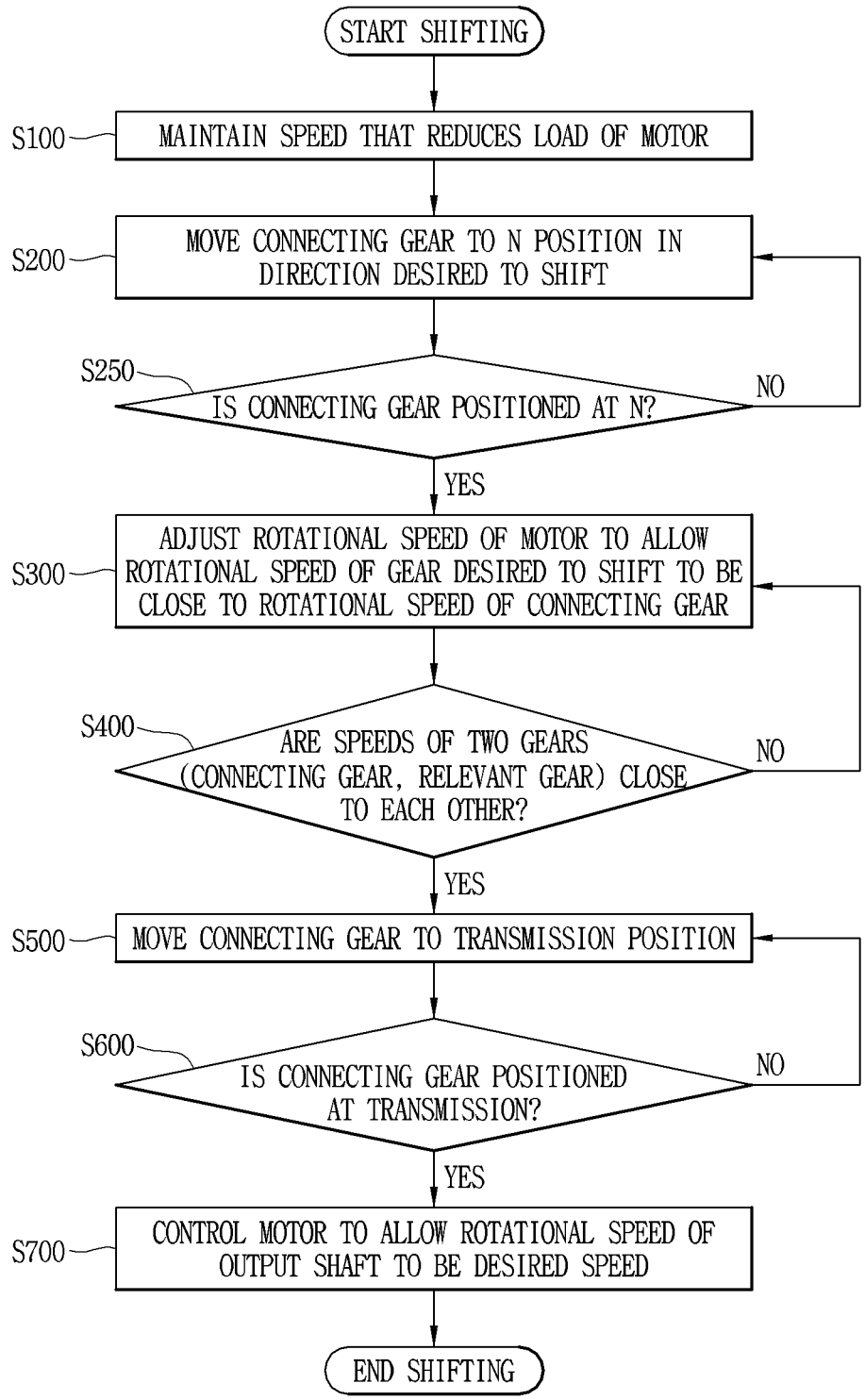
FIG. 13 is a flowchart for explaining a shift control method using an electric motor having an integral gearbox according to an embodiment of the present disclosure.

FIG. 13 is a flowchart for explaining a shift control method using an electric motor having an integral gearbox according to an embodiment of the present disclosure.

A shift control method using an electric motor with an integral gearbox according to an embodiment of the present disclosure will be described as follows.

Assuming that it is a vehicle driving situation, when a user generates a signal to shift the connected gear 410, the driving of the rotor 200 may be maintained at a speed that reduces a load of the motor to allow the connected gear to be easily separated when the connecting gear is connected to each gear plate (S100).

Next, the moving part 420 may move the connecting gear 410 to the neutral region 329 in a direction desired to shift (S200). Specifically, when a signal that increases the number of gear stage is generated while the connecting gear 410 is connected to the first gear plate 310, the moving part may move the connecting gear 410 to the neutral region 329a disposed between the second gear plate 320 and the first gear plate 310.

Next, the control unit 400 may recognize whether the connecting gear 410 is positioned in the neutral region 329 (S250). In this case, when the connecting gear 410 is not positioned in the neutral region 329, the moving part may move the connecting gear 410 to a position of the neutral region 329 again in a direction desired to shift.

Next, a rotational speed of the motor may be adjusted to allow the rotational speed of the gear plate desired to shift to be close to the rotational speed of the connecting gear 410 (S300).

Specifically, when the connecting gear 410 and the gear plate are connected to each other, in order to alleviate a shock that may occur at the connecting gear 410 and the gear plate, the rotational speed of the gear plate may be adjusted to a value close to the rotational speed of the connecting gear 410.

Next, the control unit 400 may determine whether the rotational speed of the gear plate and the rotational speed of the connecting gear 410 are close to each other (S400). At this time, the rotational speeds of the gear plate and the connecting gear 410 that are close to each other may be a case in which one rotational speed falls within a range of 95% to 105% of the other rotational speed. The rotational speed of the connecting gear 410 may refer to a value of the encoder 420a attached to an end of the output shaft.

Next, the connecting gear 410 may be moved to allow the connecting gear 410 to be connected to the gear plate desired to shift (S500). That is, the connecting gear 410 may be moved to a desired transmission position. At this time, it arrives at a time point when the two gears can be coupled to each other due to a difference in the rotational speeds of the two gears while moving the connecting gear 410.

Next, the control unit 400 may recognize whether the connecting gear 410 is connected to a target gear plate (S600). This can be determined by reading a value of the encoder connected to or built in the moving motor 450.

At this time, when the connecting gear 410 is not positioned at a target transmission (gear plate), the moving motor is operated to move the connecting gear 410 to the target position again.

Next, the motor may be controlled to allow the rotational speed of the output shaft 421 to be a desired speed (S700). Specifically, in a process of connecting the output shaft 421 and the connecting gear 410 to the target gear plate, the rotational speed of the gear plate may be maintained at a speed that reduces the load of the motor as described above. This is to facilitate separation when the connecting gear 410 is connected to the gear plate.

In addition, in a process of coupling the connecting gear 410 and the gear plate to each other, the rotational speed of the gear plate may be similarly close to that of the connecting gear 410. This is to reduce a shifting shock in the process of connecting the connecting gear 410 and the connecting part of the gear plate to each other.

Furthermore, after the connection is completed, the control unit 400 may control the motor such that the rotational speed of the gear plate becomes a desired torque value and rotational speed while the connecting gear 410 and the gear plate are connected to each other.

Figure 14:
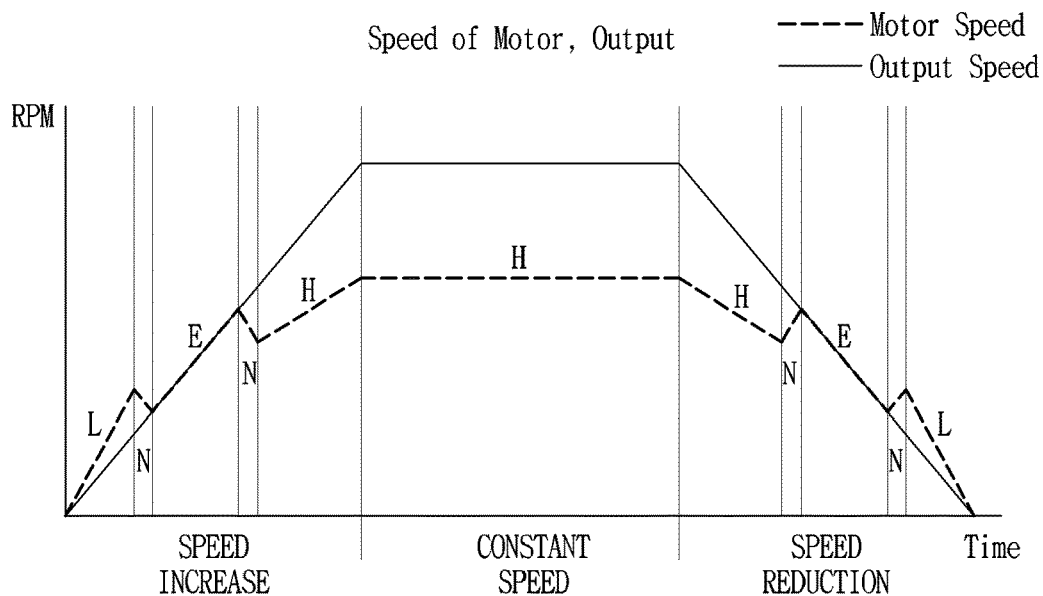
FIGS. 14 and 15 are graphs for explaining speed increase and reduction using an electric motor with an integral gearbox according to each embodiment of the present disclosure, respectively.
Figure 15:
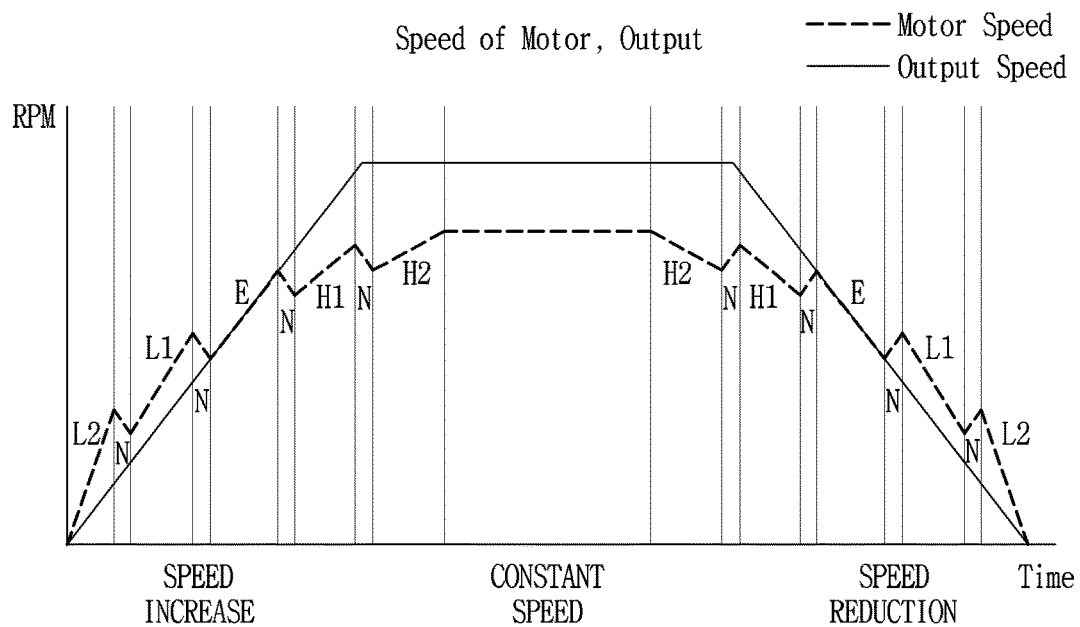

FIGS. 14 and 15 are graphs for explaining speed increase and reduction using an electric motor with an integral gearbox according to each embodiment of the present disclosure, respectively.

FIG. 14 is a diagram showing a rotational speed of the motor and a rotational speed transmitted to the output shaft 421 according to a first embodiment having three gear plates. FIG. 15 is a diagram showing a rotational speed of the motor and a rotational speed transmitted to the output shaft 421 according to a second embodiment having five gear plates.

First, referring to FIG. 14, when the connecting gear 410 is connected to the first gear plate 310, the motor speed is expressed as L. Furthermore, when the connecting gear 410 is connected to the second gear plate 320, the motor speed is expressed as E. Furthermore, when the connecting gear 410 is connected to the third gear plate 330, the motor speed is expressed as H.

When the connecting gear 410 is connected to the first gear plate 310, the rotational speed transmitted to the connecting gear 410 may be low, but the torque value may be large. Mostly, it may be used when a large force is needed when a vehicle or the like is initially started and a small rotational speed is required. That is, when the connecting gear 410 is connected to the first gear plate 310, it may serve as a low stage in the transmission.

Therefore, when looking at the graph, in a section of L, a slope of the rotational speed output to the outside by the output shaft 421 (output speed) may be lower than the motor speed.

When shifting from the section of L to a section of E, the connecting gear 410 passes through the neutral region 329, and therefore, at this time, the motor speed is reduced, but the output speed may be maintained by inertia though it is a short period of time.

In the section of E, the connecting gear 410 may be connected to the second gear plate 320. As described above, since the second gear plate 320 is connected to the rotor 200, a slope of the motor speed and a slope of the output speed may be the same. In addition, compared with the section of L, the slope of the motor speed for equally increasing the output speed may be lowered.

In a section of H, the connecting gear 410 may be connected to the third gear plate 330. Since the third gear plate 330 has a higher rotational speed of the central gear 335 of the third gear plate 330 than the rotational speed of the rotor 200 using one or more satellite gears, the rotational speed of the connecting gear 410 connected to the third gear plate 330 may be higher than the motor speed.

Therefore, it is shown that the output speed is higher than the motor speed. That is, H may be a shift state used when driving at a high speed.

Even in the case of speed reduction, it may be sequentially reduced from a state H in which the connecting gear 410 is connected to the third gear plate 330 to a state E in which the connecting gear 410 is connected to the second gear plate 320, and a state L in which the connecting gear 410 is connected to the first gear plate 310.

Even in the case of speed reduction, a slope of reducing the output speed is larger than a slope of reducing the motor speed in the state H. In addition, in the state E, the slope of reducing the motor speed is the same as the slope of reducing the output speed. In the state L, the slope of reducing the motor speed may be greater than the slope of reducing the output speed.

In FIG. 15, it merely differs in that the fourth gear plate 340 and the fifth gear plate 350 exist in addition to those illustrated in FIG. 14, and sections L2, L1, E, H1 and H2 exist, and the neutral region 329 exists between each section, and the other components are the same and similar, and therefore, the description thereof will be omitted.

Referring to FIG. 15, in a section of L2, the connecting gear 410 may be connected to the fourth gear plate 340, and for example, it may be regarded as a first stage in the gear. In a section of L1, the connecting gear 410 may be connected to the first gear plate 310, and for example, it may be regarded as a second stage in the gear. In a section of E, the connecting gear 410 may be connected to the second gear plate 320, and for example, it may be regarded as a third stage in the gear. In a section of H1, the connecting gear 410 may be connected to the third gear plate 330, and for example, it may be regarded as a fourth stage in the gear. In a section of H2, the connecting gear 410 may be connected to the fifth gear plate 350, and for example, it may be regarded as a fifth stage in the gear.

Referring to the graph, it can be seen that the slope of the output speed is constant in a speed increasing section, but the slope of the motor speed decreases in the order of L2, L1, E, H1, and H2. That is, assuming that the rotational speed of the rotor 200 is the same, the rotational speed of the output shaft 421 may be further increased.

In a speed reduction section, it can be seen that the slope of the output speed decreases constantly, but the slope of the motor speed increases in the order of L2, L1, E, H1, and H2.

As described above, though an embodiment of the present disclosure has been described, it will be apparent to those skilled in this art that various modifications, variations and additions can be made thereto without departing from the concept of the present disclosure disclosed in the claims, which also fall within the protection scope of the present disclosure.

The invention claimed is:

1. An electric motor with an integral gearbox, the electric motor comprising:
   a stator provided with a first member disposed on an inner circumferential surface of an enclosure to generate an electromagnetic force;
   a rotor provided with a second member disposed on an outer circumferential surface to face an inner circumferential surface of the stator to generate the electromagnetic force together with the first member;
   a gear assembly provided inside the rotor and configured to be shiftable; and
   a control unit that controls the gear assembly,
   wherein a gear tooth coupled to a gear plate provided in the gear assembly is disposed inside the rotor, and
   the gear assembly is configured to transmit power to an output shaft as the rotor rotates, and
   wherein the gear assembly includes one or more gear plates that rotate as the rotor rotates;
      a connecting gear disposed to be selectively coupled to any one of the one or more gear plates;
      a moving part that moves the connecting gear in an axial direction; and
      an output shaft that rotates together as the connecting gear rotates to transmit a rotating force to a load, and
      wherein the control unit moves the moving part according to a shift signal to allow the connection gear to be coupled to or decoupled from any one of the one or more gear plates to control the output shaft.

2. The electric motor of claim 1, wherein the first member is a coil part to which a current is applied, and
   the second member is a magnet.

3. The electric motor of claim 1, wherein the one or more gear plates comprise at least one satellite gear.

4. The electric motor of claim 3, wherein the one or more gear plates comprise:
   a first gear plate rotating at a first speed slower than a rotational speed of the rotor;
   a second gear plate rotating at a second speed higher than that of the first gear plate; and
   a third gear plate rotating at a third speed higher than that of the second gear plate.

5. The electric motor of claim 1, wherein each of the one or more gear plates comprises a connecting part having an inner circumferential surface in a concavoconvex shape to allow coupling to the connection gear.

6. The electric motor of claim 3, wherein the satellite gear comprises:
   a first satellite gear disposed in engagement with a gear tooth disposed inside the rotor; and
   a central gear or carrier that rotates as the first satellite gear rotates, which is disposed with a coupling hollow disposed to allow the connection gear to be coupled thereto.

7. The electric motor of claim 6, wherein the satellite gear further comprises a second satellite gear in engagement with the first satellite gear to rotate according to the rotation of the first satellite gear, and
   wherein the central gear rotates in engagement with the second satellite gear.

8. The electric motor of claim 7, wherein the gear plate carrier or central gear of the gear plate to which the connecting gear is not connected among the one or more gear plates is disposed to be released from a fixing to the enclosure.

9. The electric motor of claim 5, wherein at least one of the one or more gear plates comprises a neutral region provided between adjacent gear plates, and disposed with a hollow having an inner diameter larger than an outer circumference of the connecting gear.

10. The electric motor of claim 9, comprising:
    the control unit in which the connecting gear is fitted to the output shaft, and the connecting gear is connected to any one of the one or more gear plates to control the movement of the connecting gear to allow the output shaft to be rotated.

11. The electric motor of claim 10, wherein the control unit is configured to rotate the gear plate connected to the connecting gear at a speed close to that of the connecting gear when the connecting gear is moved by the moving part to be connected to any one of the one or more gear plates in the neutral region.

12. The electric motor of claim 10, wherein the moving part comprises:
    a moving rod threaded on one side thereof to surround the output shaft;
    a bevel gear that rotates in engagement with a screw thread disposed on the moving rod to move the connecting gear;
    an encoder that stores a position and moving distance of the moving rod; and
    a moving motor that rotates the bevel gear.

13. The electric motor of claim 12, wherein a rotation limiting surfaces that are flat on both sides are provided in a threaded region of the moving rod, and
    the moving rod is configured to move linearly as the bevel gear rotates by the rotation limiting surfaces.

14. The electric motor of claim 12, wherein the moving part further comprises a moving rod fixing device, and
    the moving rod fixing device is configured to fix the moving rod not to allow the connecting gear to move along an axial direction when there is no rotation of the moving motor.

* * * * *